(12) United States Patent
Anheyer (10) Patent No.: US 8,127,569 B2
(45) Date of Patent: Mar. 6, 2012

(54) COOLING TUBE MECHANISM FOR AN I.S. MACHINE

(75) Inventor: Wolfgang Anheyer, Neuss (DE)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 13/041,730

(22) Filed: Mar. 7, 2011

(65) Prior Publication Data

US 2011/0154859 A1 Jun. 30, 2011

Related U.S. Application Data (63) Continuation of application No. 11/639,620, filed on Dec. 15, 2006, now Pat. No. 7,905,113.

(51) Int. Cl.
*C03B 9/00* (2006.01)
*C03B 9/30* (2006.01)
*C03B 9/36* (2006.01)

(52) U.S. Cl. .......... 65/29.15; 65/68; 65/69; 65/83; 65/85; 65/160; 65/161; 65/300; 65/301

(58) Field of Classification Search ........... 65/68, 69, 65/79–85, 29.15, 29.12, 160–163, 300–301 65/261–262
See application file for complete search history.

(56) References Cited

U.S. PATENT DOCUMENTS

| | | | |
|---|---|---|---|
| 1,869,920 A * | 8/1932 | Soubier | 65/260 |
| 2,123,145 A * | 7/1938 | Peiler | 65/262 |
| 2,347,181 A * | 4/1944 | Cox, Jr. | 65/161 |
| 2,640,298 A * | 6/1953 | Winder | 65/300 |
| 3,235,353 A * | 2/1966 | Rupli | 65/262 |
| 3,236,620 A * | 2/1966 | Wiley | 65/262 |
| 3,357,810 A * | 12/1967 | Crouse | 65/234 |
| 3,403,016 A * | 9/1968 | Smith | 65/261 |
| 3,630,709 A * | 12/1971 | Irwin | 65/261 |
| 3,732,088 A * | 5/1973 | Zappia | 65/261 |
| 3,871,856 A * | 3/1975 | Trahan | 65/261 |
| 4,108,623 A * | 8/1978 | Cardenas-Franco | 65/163 |
| 4,553,999 A * | 11/1985 | Ziegler et al. | 65/84 |
| 4,579,575 A * | 4/1986 | Foster | 65/261 |
| 4,678,492 A * | 7/1987 | Foster | 65/74 |
| 4,678,494 A * | 7/1987 | Nebelung et al. | 65/261 |
| 4,726,833 A * | 2/1988 | Foster | 65/300 |
| 5,505,759 A * | 4/1996 | Meyer et al. | 65/305 |
| 5,807,419 A * | 9/1998 | Rodriguez-Wong et al. | 65/229 |
| 6,401,491 B1 * | 6/2002 | Wacke | 65/301 |
| 6,635,216 B2 * | 10/2003 | Dundas et al. | 264/525 |
| 6,705,121 B2 * | 3/2004 | Mungovan et al. | 65/261 |
| 6,766,664 B2 * | 7/2004 | Hyre et al. | 65/260 |
| 6,766,665 B2 * | 7/2004 | Hyre et al. | 65/260 |
| 6,776,009 B2 * | 8/2004 | Hyre et al. | 65/260 |
| 6,776,010 B2 * | 8/2004 | Hyre et al. | 65/301 |

(Continued)

FOREIGN PATENT DOCUMENTS

GB 2297548 A 7/1996

*Primary Examiner* — Jason L. Lazorcik
(74) *Attorney, Agent, or Firm* — Reinhart Boerner Van Deuren S.C.

(57) ABSTRACT

An I.S. machine has a blow station where a parison is blown into a bottle. The parison is blown with a blow head at the "on" position on the blow mold and following the blowing of the parison, the blow head is lifted away from the blow mold. The spacing between the blow head and the mold is defined by a Pressure Profile which is responsive to the sensed pressure within the mold.

18 Claims, 9 Drawing Sheets

U.S. PATENT DOCUMENTS

| | | | |
|---|---|---|---|
| 6,807,827 B2 * | 10/2004 | Anheyer et al. | 65/161 |
| 6,807,829 B2 * | 10/2004 | Fenton et al. | 65/261 |
| 6,810,690 B2 * | 11/2004 | Fenton et al. | 65/161 |
| 6,823,696 B2 * | 11/2004 | Fenton et al. | 65/260 |
| 6,857,291 B2 * | 2/2005 | Diehm et al. | 65/29.15 |
| 6,857,292 B2 * | 2/2005 | Fenton | 65/159 |
| 7,487,650 B2 * | 2/2009 | Hyre et al. | 65/261 |
| 7,533,542 B2 * | 5/2009 | Voisine et al. | 65/267 |
| 7,694,534 B2 * | 4/2010 | Anheyer | 65/267 |
| 7,905,113 B2 * | 3/2011 | Anheyer | 65/301 |
| 2003/0101751 A1 * | 6/2003 | Fenton et al. | 65/158 |
| 2003/0101752 A1 * | 6/2003 | Anheyer et al. | 65/161 |
| 2003/0101754 A1 | 6/2003 | Hyre et al. | |
| 2003/0101756 A1 * | 6/2003 | Diehm et al. | 65/163 |
| 2003/0101764 A1 | 6/2003 | Hyre et al. | |
| 2003/0101766 A1 * | 6/2003 | Mungovan et al. | 65/261 |
| 2008/0141720 A1 * | 6/2008 | Anheyer | 65/265 |

* cited by examiner

COOLING TUBE MECHANISM FOR AN I.S. MACHINE

CROSS-REFERENCE TO RELATED PATENT APPLICATIONS

This patent application is a continuation of co-pending U.S. patent application Ser. No. 11/639,620, filed Dec. 15, 2006, which will issue on Mar. 15, 2011, as U.S. Pat. No. 7,905,113, which is assigned to the assignee of the present patent application, and which is hereby incorporated herein by reference.

BACKGROUND OF THE INVENTION

Field of the Invention

This invention relates generally to an I.S. Machine and more particularly to a mechanism which has displaceable cooling tubes for cooling the interior of a bottle after it has been formed in a blow mold of the machine.

Glass bottles are manufactured in an I.S. Machine in a two-step process. A "parison" is first formed in a blank station and the parison is then delivered to a blow station where the parison, located within a blow mold, is blown into a bottle. The blown bottle can be displaced to a dead plate and, when cooled, pushed onto a conveyor for removal from the machine. Heat can be removed from a formed bottle by chilling the outer surface or by flowing air through a blow tube into the bottle interior.

U.S. Pat. No. 6,776,010, to Hyre et al., discloses a blow station of an I.S. Machine which utilizes a blow tube which is oscillated during the time when a bottle is in the blow mold and U.S. Pat. No. 6,766,665, also to Hyre et al., discloses post blow station structure which utilizes an oscillating tube to continue the flow of cooling air into the bottle following the removal of the bottle from the blow station.

It would be advantageous to provide an improved cooling tube mechanism for introducing cooling air into bottles formed in an I.S. Machine.

SUMMARY OF THE INVENTION

With this invention, methods of introducing cooling air into glass containers at a blow station of an I.S. Machine are disclosed.

In a first embodiment, the position of a blow head is displaced between a first on blow mold position and a second off blow mold position, a cooling tube operatively associated with the blow head is displaced between a first up position and a second down position independently of the displacement of the blow head, a source of pressurized air is provided to the cooling tube for both blowing a parison into a glass container and for cooling a glass container subsequent to it having been blown, the pressure within the blow head is sensed, and the position of the blow head is controlled according to a selected pressure profile as a function of pressure sensed within the blow head by displacing the blow head to space it from the blow mold to maintain the pressure sensed within the blowhead at the selected pressure profile over time.

In a second embodiment, the position of a blow head is varied between a first on blow mold position and a second off blow mold position, a cooling tube operatively associated with the blow head is displaced between a first up position and a second down position, a source of pressurized air is provided to the cooling tube for both blowing a parison into a glass container and for cooling a glass container subsequent to it having been blown, pressure within the blow head is sensed, and controlling the position of the blow head and the position of the cooling tube are controlled as a function of a control algorithm.

In a third embodiment, the position of a blow head is varied between a first on blow mold position and a second off blow mold position, a cooling tube operatively associated with the blow head is displaced between a first up position and a second down position, a source of pressurized air is provided to the cooling tube for both blowing a parison into a glass container and for cooling a glass container subsequent to it having been blown, the pressure within the blow head is sensed, and the position of the blow head is controlled according to a selected pressure profile as a function of pressure sensed within the blowhead.

DESCRIPTION OF THE DRAWINGS

These and other advantages of the present invention are best understood with reference to the drawings, in which.

DETAILED DESCRIPTION OF THE EXEMPLARY EMBODIMENT

Figure 1:
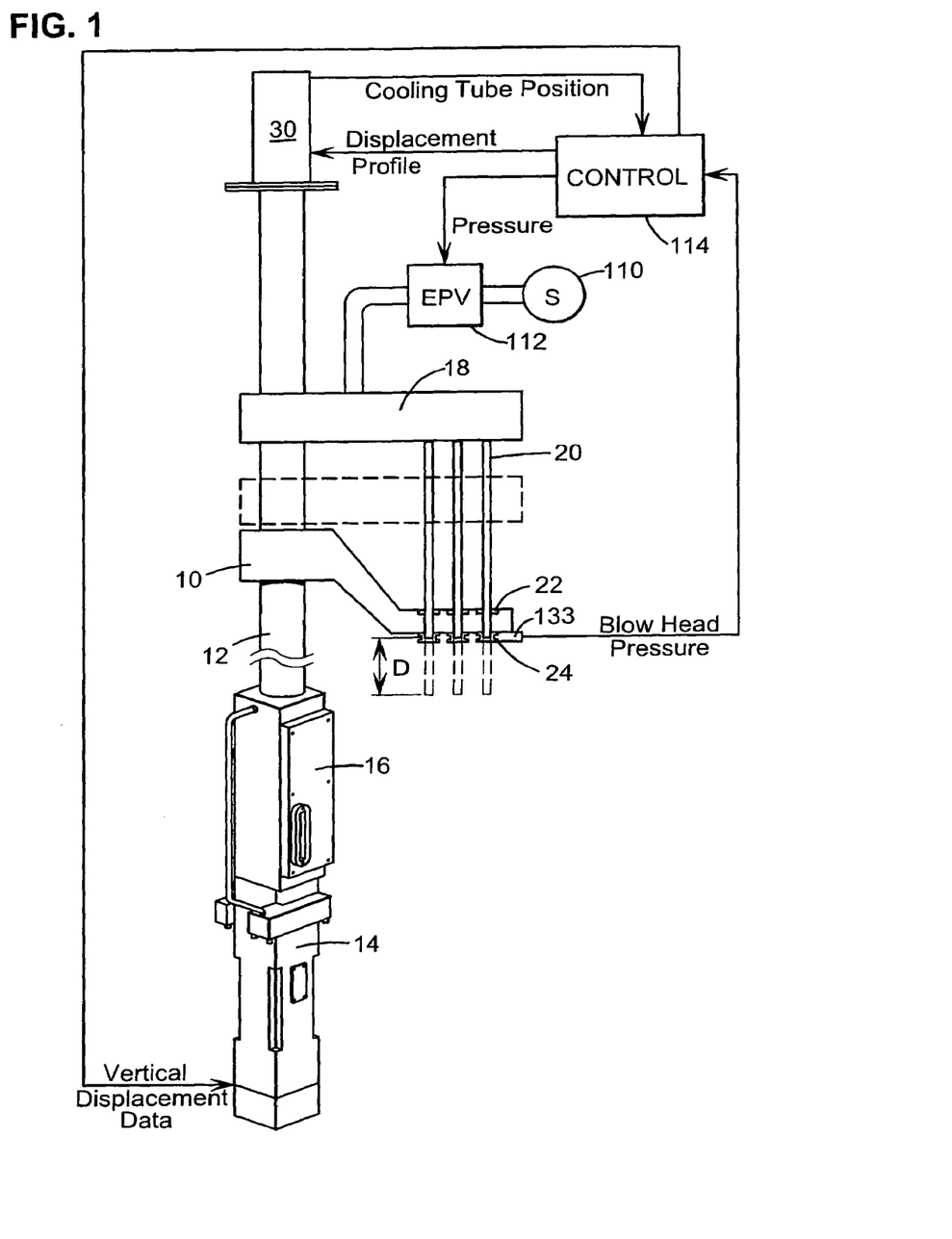
FIG. 1 is a schematic showing of a blow head mechanism for an I.S. Machine made in accordance with the teachings of the present invention.

FIG. 1 illustrates a blow head mechanism for an I.S. Machine which includes a guide arm 10 which is mounted on a vertical post 12. The post 12 is coupled to an electronic (servo) motor 14 which causes the guide arm to move between up and down locations. A conventional scroll cam assembly 16, causes the guide arm to pivot between retracted and advanced positions. The up/retracted position is the "off" position and the advanced/down position is the "on" position. The blow head mechanism also includes a cooling tube arm assembly 18 which supports a number of cooling tubes 20 which correspond in number to the number of bottles being formed in the blow station. The cooling tube arm assembly is shown at its first position where the cooling tubes extend downwardly into vertical openings in the guide arm. Suitable guides 22 are located at the top of these openings in the guide arm.

Blow heads 24 are secured to the guide arm at the bottom of these openings. The cooling tube arm assembly is mounted on the post 12 and will move with the guide arm between on and off positions. At the first position, a parison could be blown into a bottle within a blow mold. The cooling tube guide assembly is also displaceable between the illustrated first position, where the bottom of the cooling tubes are located for blowing a parison into a bottle and a second position, shown in dotted lines, where the cooling tubes have been lowered a selected distance D, which corresponds to the insertion of the cooling tube to a position proximate the bottom of the blow bottle.

Figure 2:
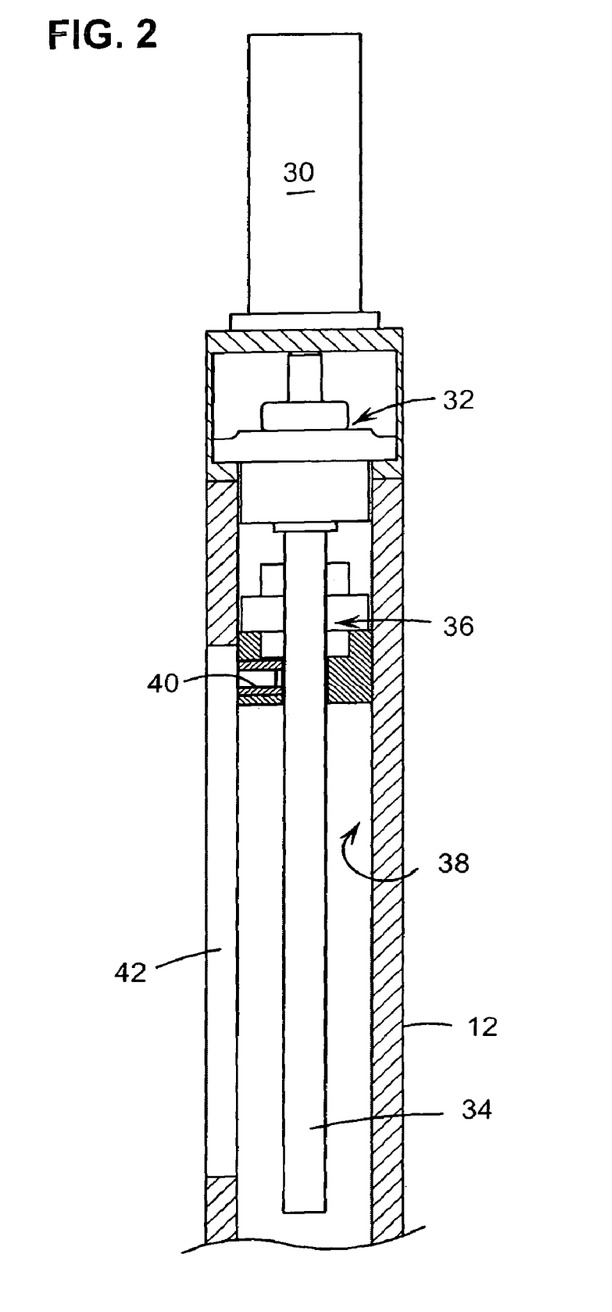
FIG. 2 is an elevational cross sectional view of the top portion of the blow head column illustrated in FIG. 1.
Figure 3:
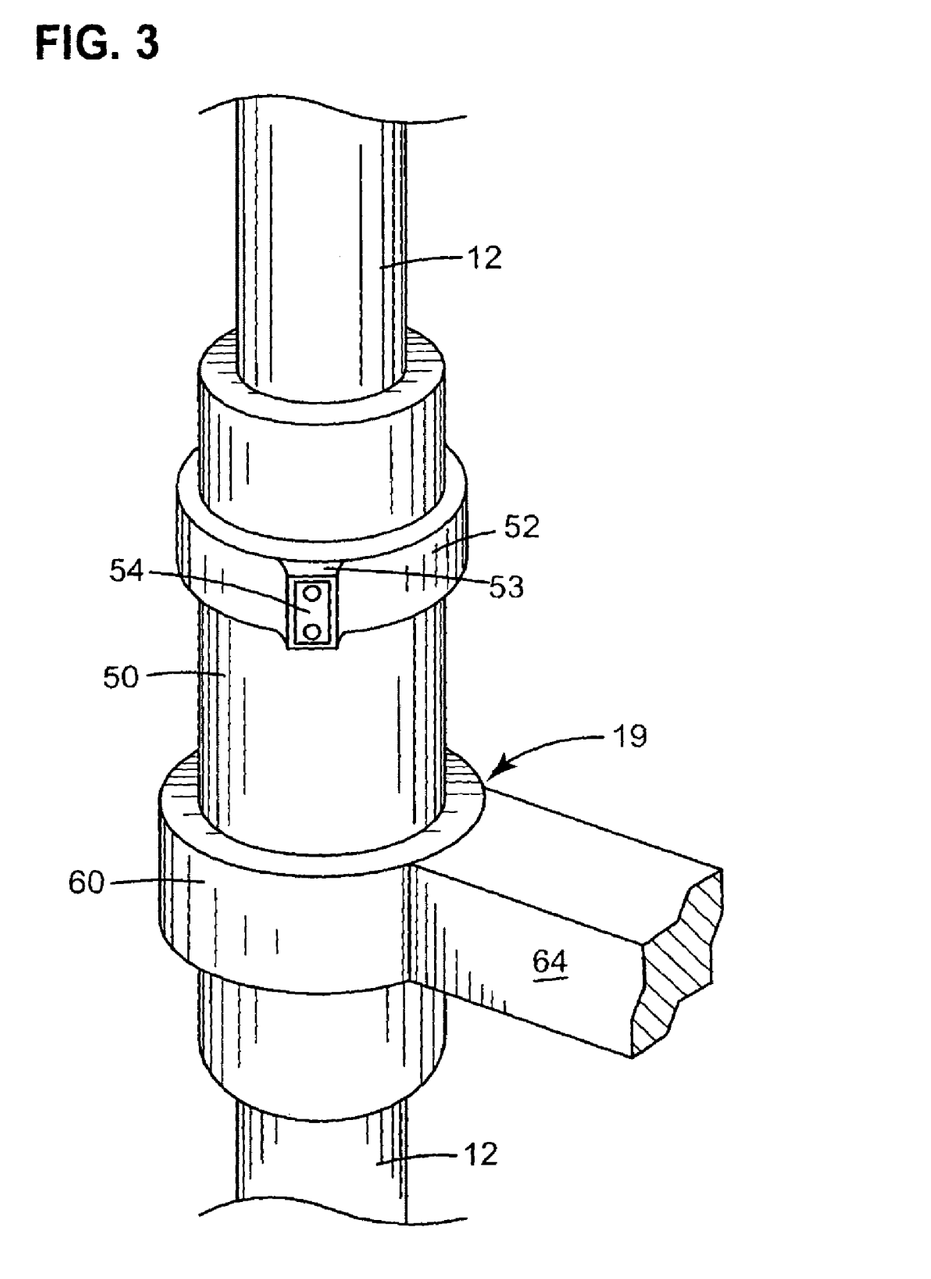
FIG. 3 is a perspective view of a slidable support for the cooling tube assembly.
Figure 4:
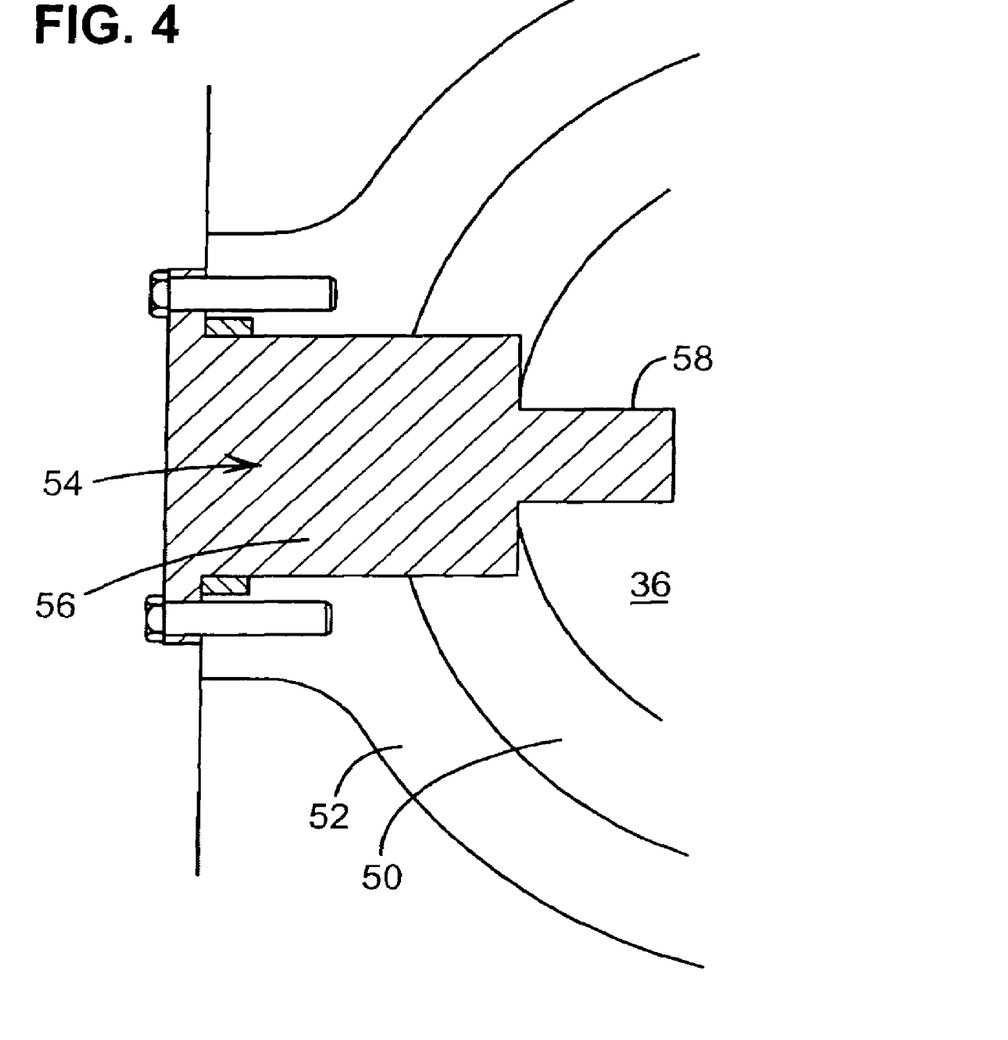
FIG. 4 is a portion of a horizontal cross sectional view of the column taken at 4-4 of FIG. 2.

The drive assembly for the cooling tube arm assembly is shown in FIG. 2 and includes a servo motor connected via a coupling 32 to a lead screw 34. The lead screw is operatively associated with a nut 36 which can be driven along the inner bore 38 defined in the upper portion of the post 12. The nut has a pin receiving hole 40 and the post has an elongated vertical slot 42. Vertically displaceable along the outer surface of the post is a slide housing 50 (FIG. 3). Proximate the top of the slide housing is a collar 52 having a boss 53 which supports a key 54 (see also FIG. 4) having a first key portion 56 for fitting the slot 42 of the post and a second pin portion 58 for fitting the pin receiving hole 40 in the nut 36. The slide housing will accordingly be vertically displaced with the nut.

Figure 5:
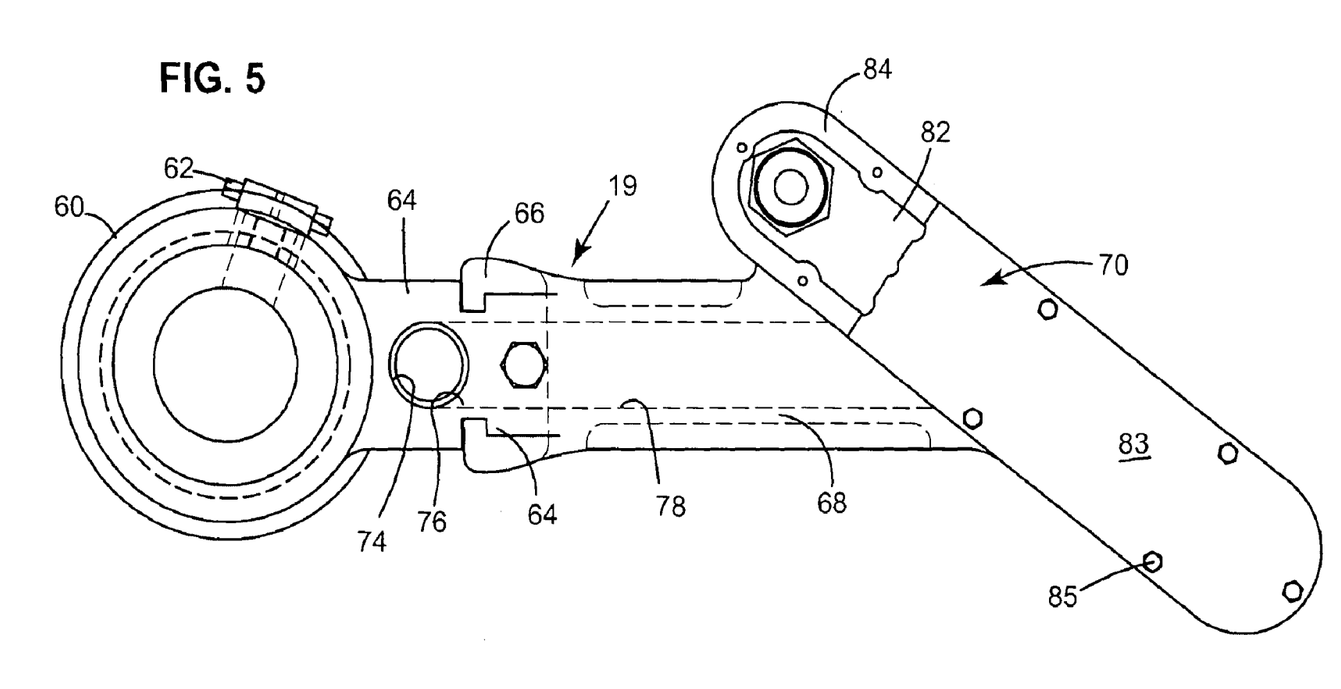
FIG. 5 is a top view of the cooling tube assembly.
Figure 6:
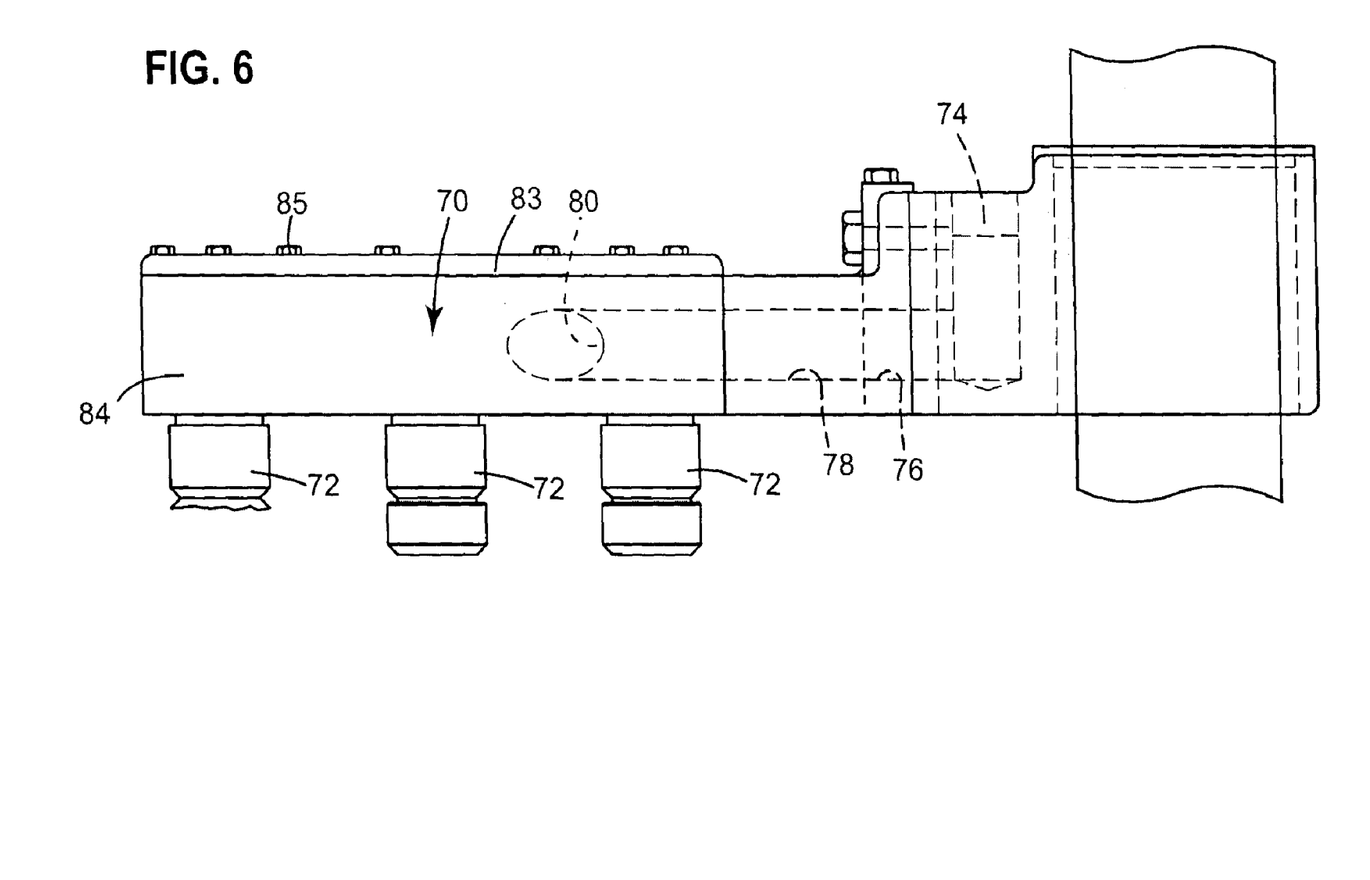
FIG. 6 is an elevational view of the cooling tube assembly.

Releasably secured to the slide housing is the cooling tube arm 18. The cooling tube arm has a cylindrical mounting sleeve portion 60 (FIG. 5) which is slidingly received by the slide housing and which can be secured to the slide housing at any vertical location below the collar 52 and at any angular position with a mounting screw 62. The mounting sleeve portion 60 has a keyed portion 64 which receives a corresponding portion 66 at the end of the arm portion 68 of the cooling tube arm. The cooling tube arm supports an elongated plenum or fluid chamber 70. Compressed air or other cooling fluid is supplied, via an inlet 74 (FIG. 6) on the mounting sleeve portion 60, to a mounting sleeve portion bore 76. This bore communicates with a bore 78 in the arm portion 68 which communicates via opening 80 with the interior 82 of the plenum chamber. Access to the plenum chamber is provided by a top 83 secured by suitable screws 85.

Figure 7:
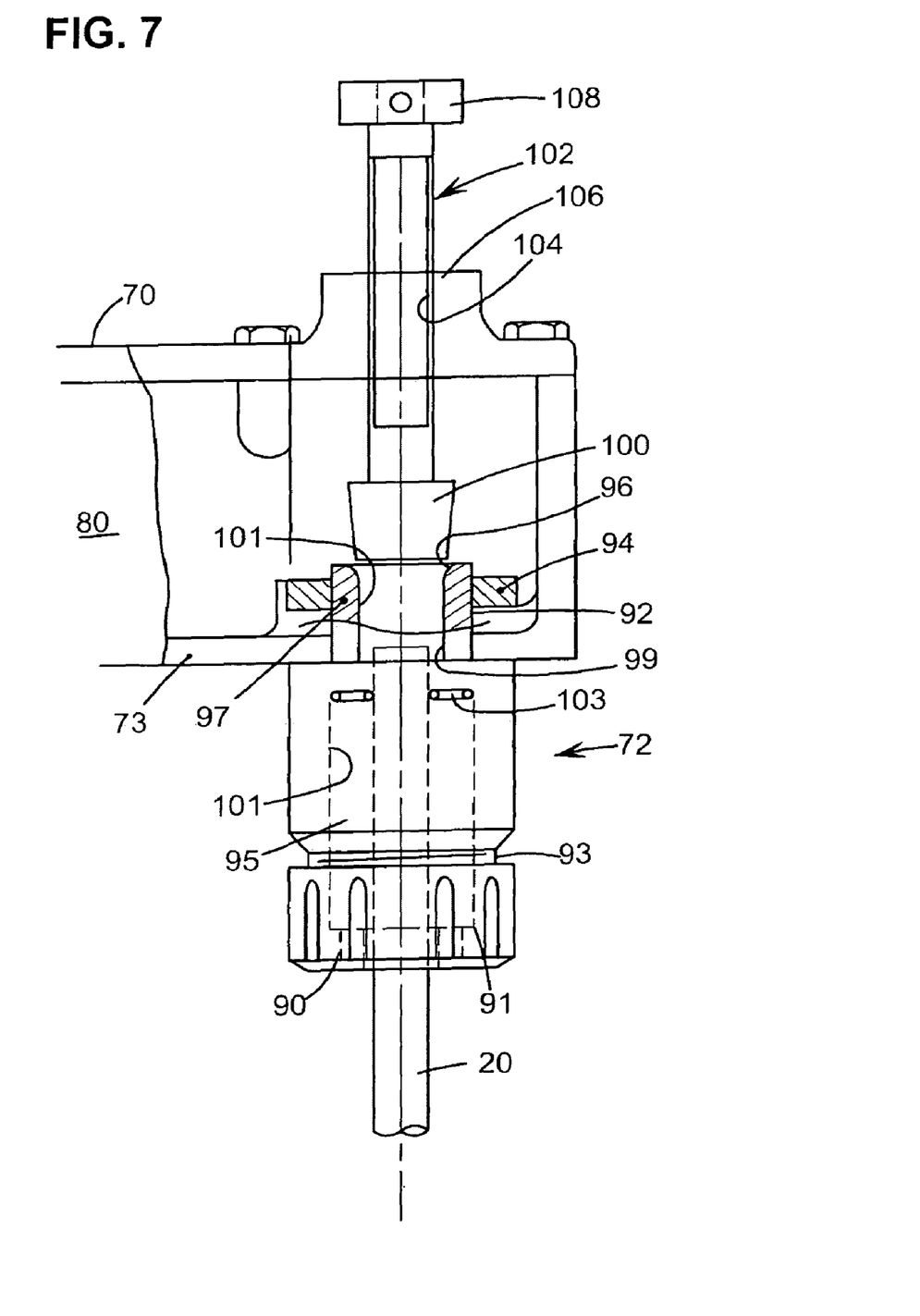
FIG. 7 is cross sectional view of a cooling the head and associated flow control.

A cooling tube chuck 72, for each cooling tube, is attached to the bottom wall 73 of the plenum chamber. The cooling tube chuck, shown in FIG. 7, is defined by a conventional collet 90, a conventional collet nut 91, and a conventional collet holder 95, which has a first threaded end 93 for receiving the collet nut. The conventionally tapered end of the collet holder has been modified to include a second externally threaded 92, reduced diameter post portion 97 sized to pass through a hole 99 in the bottom wall 73 of the plenum chamber. The post portion receives a clamp nut 94 for sealingly mounting the collet holder on the bottom wall of the plenum chamber. A stepped axial hole 101 extends through the collet holder.

Figure 8:
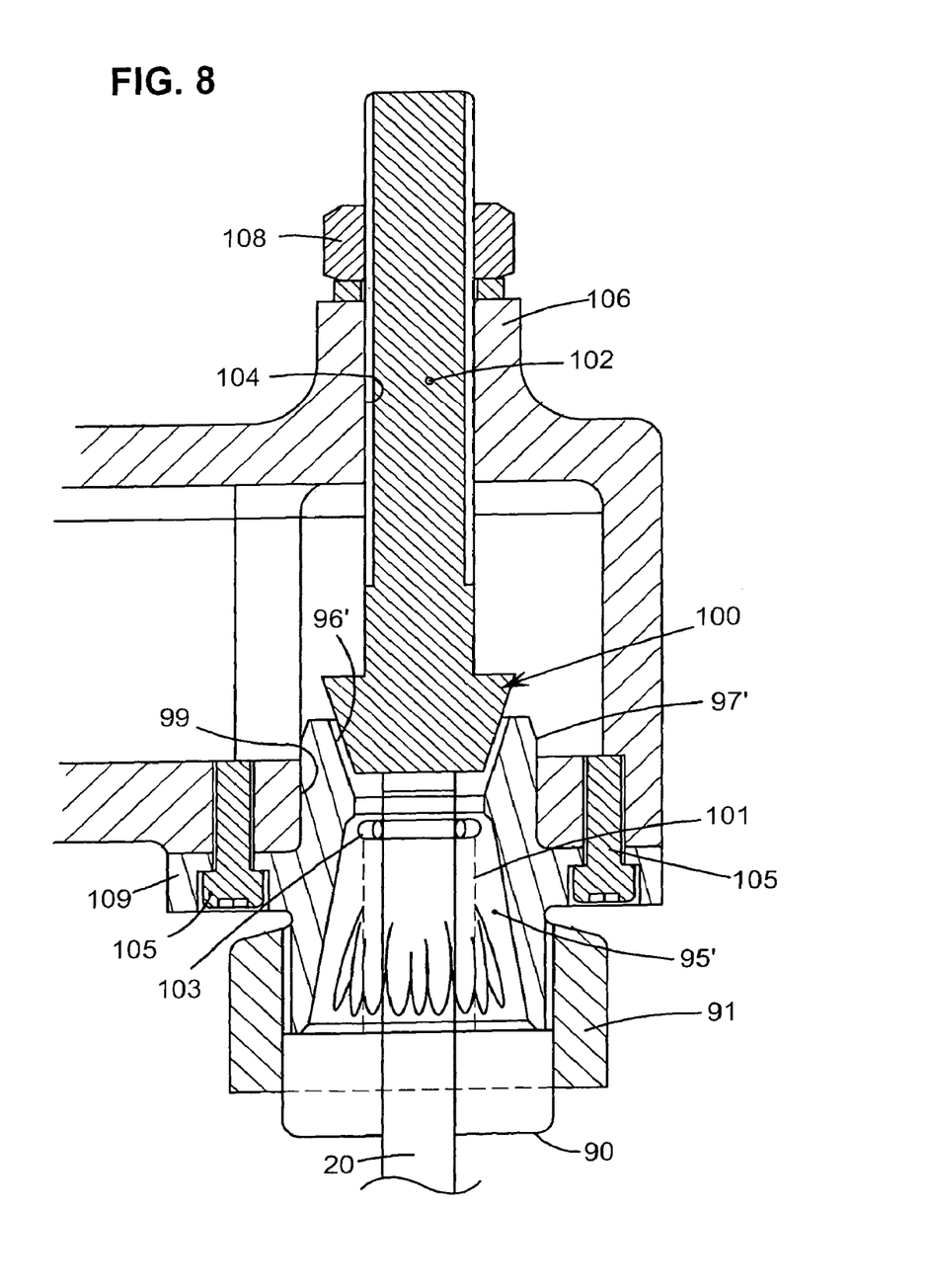
FIG. 8 is an oblique view showing an alternate coupling device for the cooling tube chuck shown in FIG. 7.

Alternately, the collet holder 95' may be designed to have an enlarged clamp plate 109 (FIG. 8) which can be releasably secured to the bottom wall of the plenum chamber from the outside of the plenum chamber via suitable screws 105 (the post 97' need not be externally threaded with this attachment). The cooling tube chuck releasably holds a collet 90 suitable for holding a particular cooling tube 20. The collet holder 95, 95 is effectively sealed via an inside/outside sealing ring 103 (an available collet accessory). The outer diameter of the cooling tube is selected to correspond with the inner seal dimension. Cooling tubes can accordingly be quickly attached to or removed from the plenum chamber.

The inner annular surface of the reduced diameter post 97, 97' opening is radiused/bevelled 96, 96' and located axially above the post is a needle valve 100, which is at the end of a threaded shaft 102. The threaded shaft is received by a threaded hole 104 in a boss 106 and has a turn knob 108 at the top. Flow into each cooling tube can accordingly be varied to achieve the desired flow through each cooling tube.

In operation, a parison, located in a blow mold, can be blown into a bottle when the guide arm and the cooling tube arm are at the advanced/down position and the cooling tube arm is at the first, blow parison, up position. The cooling tube functions as the blow tube of the blow head. Once the parison has been blown into a bottle the blow tube arm can be displaced vertically from the first position to the second, bottom or down, position to deliver cooling air, as desired, at a location proximate the bottom of the bottle. While the invention has been disclosed as a blow head mechanism, the structure, minus the blowheads could be a mechanism used to cool bottles at a dead plate location or at any subsequent location in the glass process.

Figure 9:
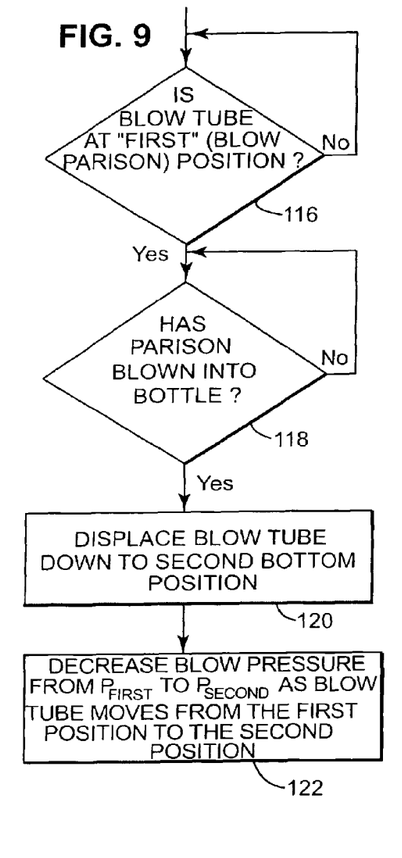
FIG. 9 is a logic diagram illustrating the control of air pressure to the cooling tubes as a function of position as they are displaced from the up position to the down position following the blowing of a parison into a bottle.

As shown in FIG. 1, air under pressure can be supplied to the cooling tube arm from a suitable source S/110 of high pressure air. The supplied air passes through an electronically controlled proportional valve (EPV/112) at a Pressure selected by a suitable Control 114. As shown in FIG. 1, the Control supplies a Displacement Profile to the Motor 30 and receives Cooling Tube Position data from the motor 30. When the Control, as shown in FIG. 9, answers the query "Is Blow Tube At "First" (Blow Parison) Position"/116 in the affirmative and determines that the parison has been blown into a bottle (answers the query "Has Parison Blown Into A Bottle"/118 in the affirmative), it will issue a signal, "Displace Blow Tube Down To Second Bottom Position"/120 and will conjointly "Decrease Blow Pressure From $P_{first}$ to $P_{second}$ As Blow Tube Moves From The First Position To The Second Position"/122. The system may either automatically determine that the parison has been blown or the time of this event may be set by the operator based on his experience. Such decrease in pressure may be linear.

Figure 10:
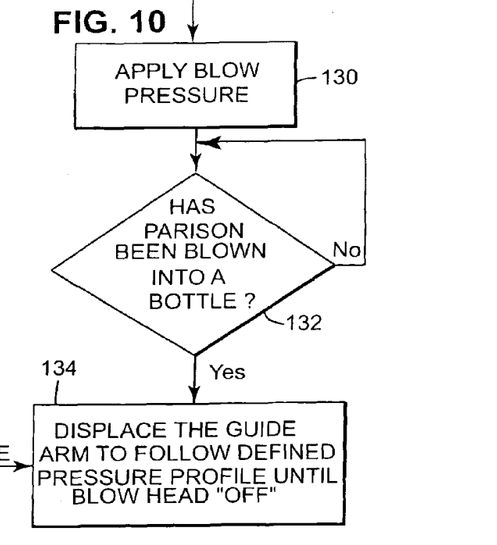
FIG. 10 is a logic diagram illustrating the control of the vertical displacement of the control arm as a function of blow head pressure.

FIG. 10 illustrates a control algorithm for the guide arm. When the blow heads are at the "on" position, the Control 114 will issue an instruction to Apply Blow Pressure 130. When the control answers the inquiry "Has Parison Been Blown Into A Bottle" 132 in the affirmative, which can be based on detecting a drop in pressure at the blow head pressure sensor 133 or by the operator setting an event angle in the timing control for the time when he believes formation occurs, the Control 114 will "Displace The Guide Arm To Follow Defined Pressure Profile Until Blow Head "Off" 134. The operator can input the desired Pressure Profile.

For example, the Pressure Profile may be a constant pressure profile set at a level that will maintain the blown parison against the inner surface of the mold. The guide arm 10 would accordingly be displaced to a location where the heads were spaced from the top of the blow molds and would thereafter be displaced vertically up or down in response to an increase or decrease in the pressure of Source air delivered to the cooling tube. In the above situation where the source pressure is reduced, following blowing the parison into a bottle, as the cooling tube is lowered and the pressure reduced, this algorithm would result in the blow head, being displaced toward the top of the blow mold to maintain the desired constant internal pressure The Pressure Profile could also provide for an increase in internal pressure as a function of time following the blowing of the parison. This could be the case, for example, in the event that the source pressure was substantially increased following the blowing of the parison and the partial cooling of the bottle. The arm could follow a pressure profile where the pressure increases over time (the arm would be progressively lowered) as the bottle progressively cools and strengthens.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of introducing cooling air into a glass container in a blow mold at a blow station of an I.S. Machine, the blow station including a guide arm supporting a blow head and a cooling tube arm assembly supporting a cooling tube operatively associated with the blow head, the method comprising:
   displacing the blow head between a first on blow mold position and a second off blow mold position;
   providing pressurized air to the cooling tube to blow a parison into the glass container in the blow mold;
   displacing the cooling tube operatively associated with the blow head between a first up position and a second down position;
   providing pressurized air to the cooling tube to cool the glass container subsequent to it having been blown;
   sensing the pressure within the blow head; and
   controlling the position of the blow head according to a selected pressure profile as a function of pressure sensed within the blow head.

2. A method as defined in claim 1, additionally comprising:
   controlling the position of the cooling tube to displace it from the first up position to the second down position after the parison has been blown into the glass container.

3. A method as defined in claim 2, additionally comprising:
   receiving data indicating the position of the cooling tube and using the data indicating the position of the cooling tube to control the position of the cooling tube.

4. A method as defined in claim 2, additionally comprising:
   decreasing the pressure of the pressurized air as the cooling tube is displaced from the first up position to the second down position.

5. A method as defined in claim 4, wherein the pressure of the pressurized air as the cooling tube is displaced from the first up position to the second down position is decreased linearly.

6. A method as defined in claim 4, wherein the decreasing step further comprises:
   displacing the blow head in a direction from the first on blow mold position toward the second off blow mold position to space it farther from the blow mold.

7. A method as defined in claim 1, additionally comprising:
   determining that the parison has been blown into the glass container.

8. A method as defined in claim 7, wherein the determining step comprises:
   determining that a predetermined period of time after the application of the supply of pressurized air to blow the parison with the blow head in the on blow mold position has elapsed.

9. A method as defined in claim 7, wherein the determining step comprises:
   detecting a drop in the pressure within the blow head after the application of pressurized air to blow the parison with the blow head in the on blow mold position.

10. A method as defined in claim 1 wherein the providing pressurized air comprises:
    regulating the pressurized air with an electronically controlled proportional valve.

11. A method of introducing cooling air into a glass container in a blow mold at a blow station of an I.S. Machine, the blow station including a guide arm supporting a blow head and a cooling tube arm assembly supporting a cooling tube operatively associated with the blow head, the method comprising:
    providing pressurized air to the cooling tube to blow a parison in the blow mold to form the glass container:
    displacing the cooling tube operatively associated with the blow head between a first up position and a second down position;
    providing pressurized air to the cooling tube to cool the glass container subsequent to it having been blown;
    defining a pressure profile; and
    based on the pressure of the pressurized air supplied to the cooling tube, controlling the position of the blow head to follow the pressure profile by displacing the guide arm as a function of a control algorithm.

12. A method as defined in claim 11, wherein the controlling step additionally comprises:
    determining that the parison has been blown into the glass container.

13. A method as defined in claim 12, wherein the controlling step additionally comprises:
    subsequent to a determination that the parison has been blown into the glass container, controlling the position of the cooling tube to displace it from the first up position to the second down position.

14. A method as defined in claim 13, wherein the controlling step additionally comprises:
    decreasing the pressure of the pressurized air sensed as the cooling tube is displaced from the first up position to the second down position.

15. A method of introducing cooling air into a glass container at a blow station of an I.S. Machine, the blow station including a guide arm supporting a blow head and a cooling tube arm assembly supporting a cooling tube operatively associated with the blow head, the method comprising:
    providing pressurized air to the cooling tube to blow a parison in a blow mold;
    detecting a drop in pressure at a blow head pressure sensor indicating that the parison has been blown;
    displacing the guide arm to space the blow head from the top of the blow mold; and
    subsequently controlling the displacement of the guide arm to displace the blow head relative to the blow mold based on an algorithm to follow a selected pressure profile.

16. A method as defined in claim 15, wherein the controlling step comprises:
    subsequent to the parison having been blown into the glass container, varying the position of the blow head to cause the pressure sensed within the blowhead to one of maintain a constant pressure within the blown parison and increase pressure within the blown parison.

17. A method as defined in claim 15, further comprising: subsequent to the parison having been blown into the glass container, controlling the position of the cooling tube to displace it from the first up position to the second down position.

18. A method as defined in claim 17, wherein the controlling step additionally comprises:
decreasing the pressure of the pressurized air as the cooling tube is displaced from the first up position to the second down position.

* * * * *

UNITED STATES PATENT AND TRADEMARK OFFICE
CERTIFICATE OF CORRECTION

| | | |
|---|---|---|
| PATENT NO. | : 8,127,569 B2 | Page 1 of 1 |
| APPLICATION NO. | : 13/041730 | |
| DATED | : March 6, 2012 | |
| INVENTOR(S) | : Anheyer | |

It is certified that error appears in the above-identified patent and that said Letters Patent is hereby corrected as shown below:

In the specification:

Column 3, line 9:

"shown in FIG. 2 and includes a servo motor connected via a" should read --shown in FIG. 2 and includes a servo motor 30 connected via a--.

Signed and Sealed this
Eighth Day of May, 2012

David J. Kappos
*Director of the United States Patent and Trademark Office*